United States Patent [19]

Yunoki et al.

[11] Patent Number: 4,614,966
[45] Date of Patent: Sep. 30, 1986

[54] ELECTRONIC STILL CAMERA FOR GENERATING LONG TIME EXPOSURE BY ADDING RESULTS OF MULTIPLE SHORT TIME EXPOSURES

[75] Inventors: Yutaka Yunoki; Kenji Kimura, both of Tokyo, Japan

[73] Assignee: Olympus Optical Co., Ltd., Tokyo, Japan

[21] Appl. No.: 524,121

[22] Filed: Aug. 16, 1983

[30] Foreign Application Priority Data

Aug. 20, 1982 [JP] Japan .................. 57-144560

[51] Int. Cl.$^4$ ............ H04N 9/077; H04N 5/228; H04N 5/30; H04N 9/04
[52] U.S. Cl. ........................ 358/44; 358/41; 358/211; 358/212; 358/221; 358/909
[58] Field of Search .......... 358/909, 211, 213, 41, 358/43, 44, 50, 209, 212, 221

[56] References Cited

U.S. PATENT DOCUMENTS

| | | | |
|---|---|---|---|
| 4,131,919 | 12/1978 | Lloyd et al. | 358/909 |
| 4,415,937 | 11/1983 | Nishizawa et al. | 358/909 |
| 4,503,466 | 3/1985 | Ryan | 358/211 |

FOREIGN PATENT DOCUMENTS

| | | | |
|---|---|---|---|
| 103577 | 8/1981 | Japan | 358/213 |
| 17273 | 1/1982 | Japan | 358/909 |
| 212874 | 12/1982 | Japan | 358/909 |
| 212876 | 12/1982 | Japan | 358/909 |

OTHER PUBLICATIONS

Sapirstein, R. L., "Improving Low-Illumination Video", NASA Tech. Briefs, Spring 1979, p. 18.

Primary Examiner—James J. Groody
Assistant Examiner—Randall S. Svihla
Attorney, Agent, or Firm—Frishauf, Holtz, Goodman & Woodward

[57] ABSTRACT

An image recording apparatus includes a solid state image pickup; an A/D converter for converting a one-frame analog image signal from the solid-state image pickup to a one-frame digital image signal; and a recorder coupled to the A/D converter for accumulating a plurality of one-frame digital image signals which are intermittently and successively picked up by the image pickup and output from the A/D converter to form a single one-frame digital image signal, and for recording the single one-frame digital image signal. The recorder includes a memory for storing the single one-frame digital image signal. An adder is provided for adding the one-frame digital image signal produced from the A/D converter and a single one-frame digital signal produced from the memory, and for writing the addition results into the memory. A detector is coupled to an output of the adder for detecting a minimum value of the single one-frame digital image signal, and a subtracter is provided for subtracting the minimum value from the single one-frame digital image signal read out from the memory.

18 Claims, 26 Drawing Figures

ELECTRONIC STILL CAMERA FOR GENERATING LONG TIME EXPOSURE BY ADDING RESULTS OF MULTIPLE SHORT TIME EXPOSURES

BACKGROUND OF THE INVENTION

The present invention relates to an image recording apparatus for recording an image, especially a still image obtained by a solid-state image pickup device.

Recently, image recording apparatuses, called "electronic cameras", have been made commercially available, in lieu of conventional cameras using silver chloride films, to record a still image as an image signal. A solid-state image pickup device serving as an image pickup camera is used in the image recording apparatus of this type, to satisfy the need for portability.

In conventional photography for general and scientific purposes, exposure times often exceed 10 seconds. The exposure time of the conventional camera corresponds to a light-receiving time interval of the solid-state image pickup device of the electronic camera.

The solid-state image pickup device stores a signal charge produced by incident light energy during the light-receiving time interval. In general, the solid-state image pickup device produces not only a signal current corresponding to incident light energy, but also a dark current due to heat or the like. When the solid-state image pickup device is exposed to light for a long period of time, a dark current charge which is greater than the signal charge is often stored. This dark current charge has the same polarity as that of the signal charge. It is very difficult to remove the dark current component from the signal component after the light-receiving period. As a result, long exposure cannot be generally performed in the solid-state image pickup device, since the S/N ratio is lowered and the image quality is degraded. Furthermore, the solid-state image pickup device can store only a small amount of charge therein. When a large amount of dark current charge is stored in the solid-state image pickup device by long exposure, the dynamic range of the camera is narrowed, thus degrading image quality. In this manner, long exposure cannot be performed in the electronic camera.

SUMMARY OF THE INVENTION

One object of the present invention is to provide an image recording apparatus employing a solid-state image pickup device, wherein the image quality will not be degraded, even if a still image is photographed via long exposure.

To achieve the above object of the present invention, an image recording apparatus is provided, which comprises a solid-state image pickup device, an A/D converter for converting a one-frame analog image signal produced by the solid-state image pickup device to a one-frame digital image signal and a recording section for accumulating a plurality of one-frame digital image signals from the A/D converter, to form a one-frame digital image signal, and for recording the one-frame digital image signal accumulated.

DETAILED DESCRIPTION OF THE PREFERRED EMBODIMENTS

Figure 1:
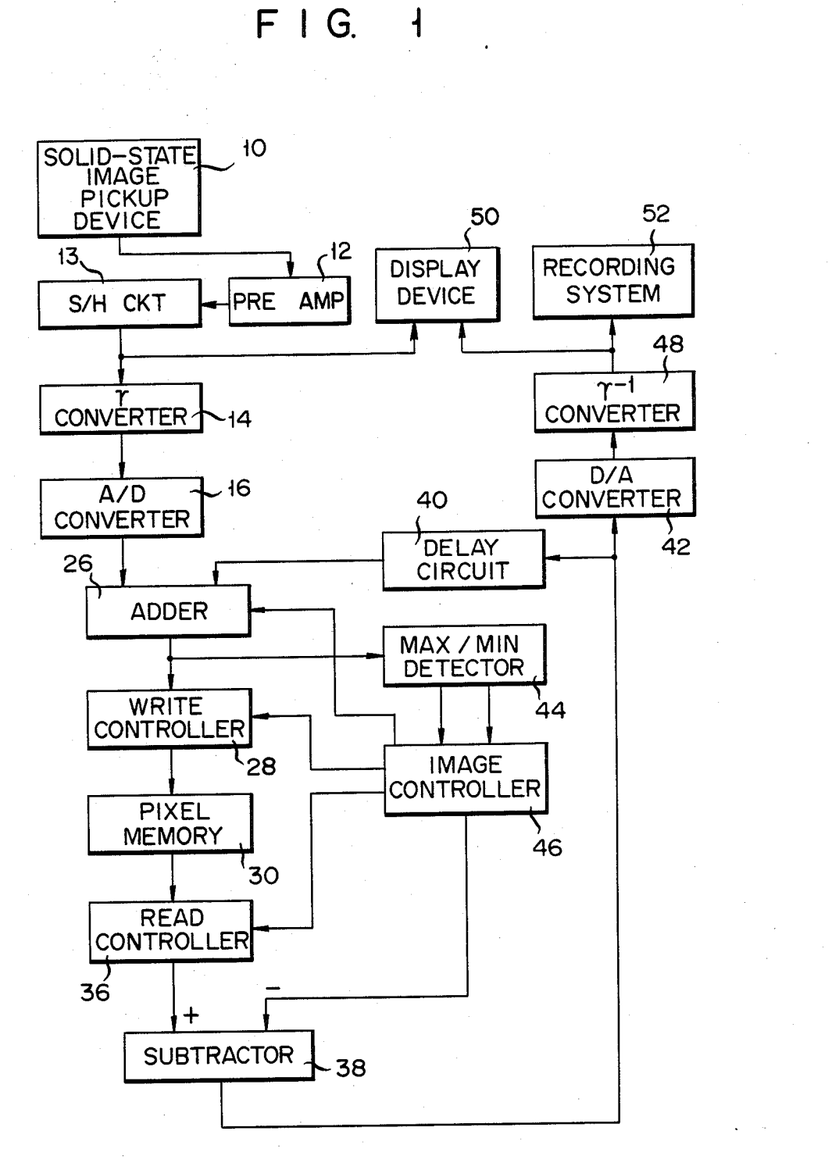
FIG. 1 is a block diagram of an image recording apparatus according to a first embodiment of the present invention.
Figure 2:
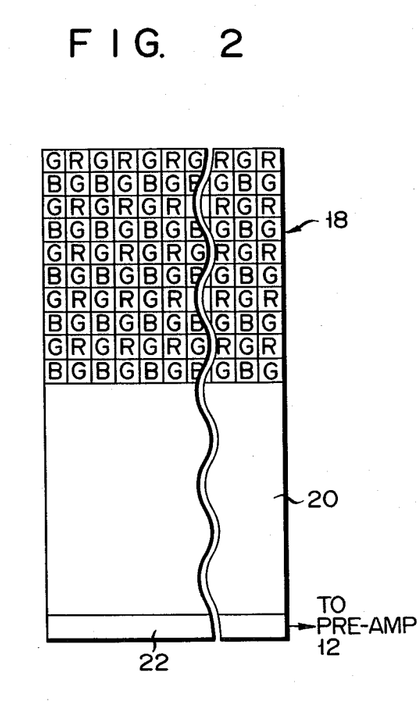
FIGS. 2 to 4 are diagrams showing solid-state image pickup devices for the apparatus shown in FIG. 1.
Figure 3:
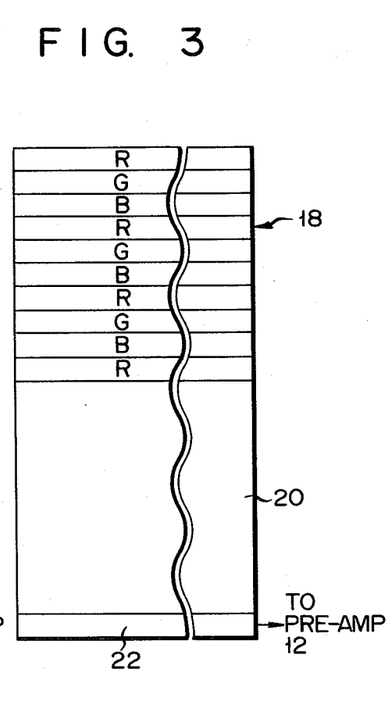
Figure 4:
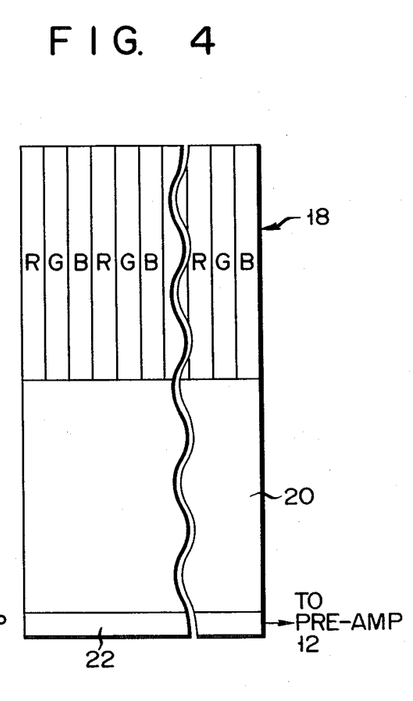
Figure 5:
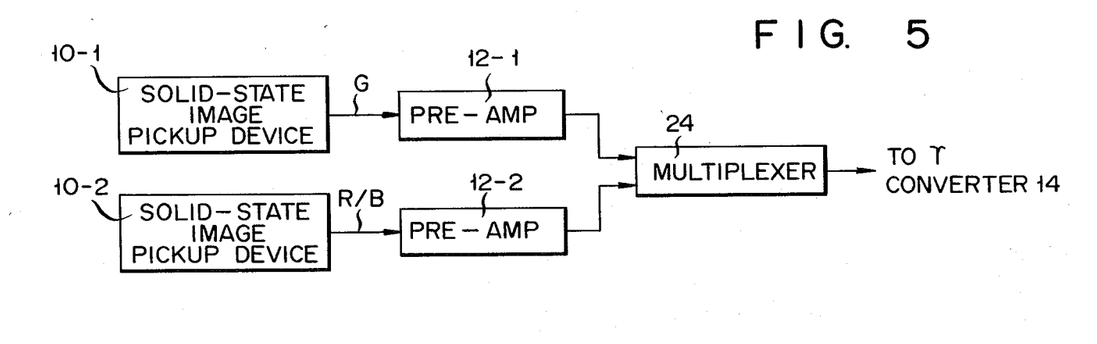
FIGS. 5 and 6 are block diagrams of two and three-chip type solid-state image pickup devices for the apparatus shown in FIG. 1, respectively.
Figure 6:
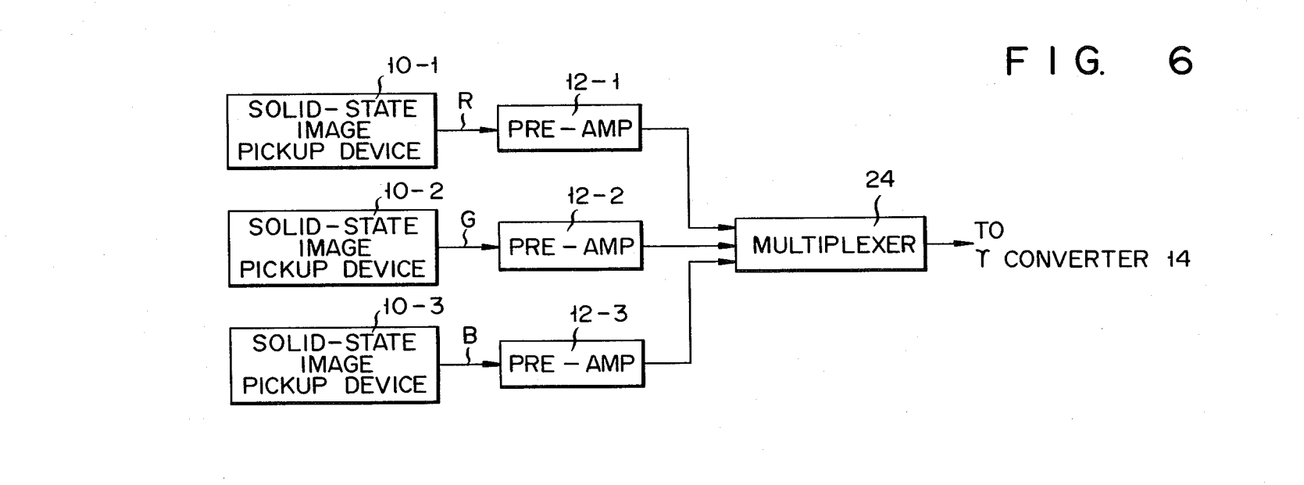

FIG. 1 is a block diagram of the present apparatus in a first embodiment. Outputs from a solid-state image pickup device 10 are supplied to an A/D converter 16 through a preamplifier 12, S/H circuit 13 and a $\gamma$ converter 14. The solid-state image pickup device 10 serially generates discrete pixel signals of respective pixels arranged in a matrix form. These discrete pixel signals are amplified and sampled/held. The S/H circuit 13 thus provides a single continuous image signal. An X-Y addressing type device having photoelectric transducer elements and switching elements which are arranged in a matrix form, or a signal charge transfer type device having a CCD, a BBD, or the like, can be used as the solid-state image pickup device 10. Single-chip CCD devices shown in FIGS. 2 to 4 are exemplified as the solid-state image pickup device 10. The CCDs are illustrated as frame transfer type devices, each comprising a light-receiving section 18, a storage section 20, and a horizontal shift register 22. However, the CCD can be of an interline type. FIG. 2 shows a single-chip CCD device having a color filter with R, G and B color component pixels arranged on the light-receiving section 18 in a mosaic form. FIG. 3 shows a single-chip CCD device having a color filter with R, G and B color component stripes arranged on the light-receiving section 18 in horizontal arrays. FIG. 4 shows a single-chip CCD device having R, G and B color component stripes arranged on the light-receiving section 18 in vertical arrays. Instead of a single-chip type image pickup device 10, a two-chip CCD device (FIG. 5) having G and R/B filters or a three-chip CCD device (FIG. 6) having R, G and B filters can be used as the solid-state image pickup device 10. Since the R, G and B color component signals are processed as a composite signal, the color component signals must be produced through a multiplexer 24 when a solid-state image pickup device having a plurality of chips is used. The present invention is not limited to a color image but may be extended to a monochrome image.

Figure 7:
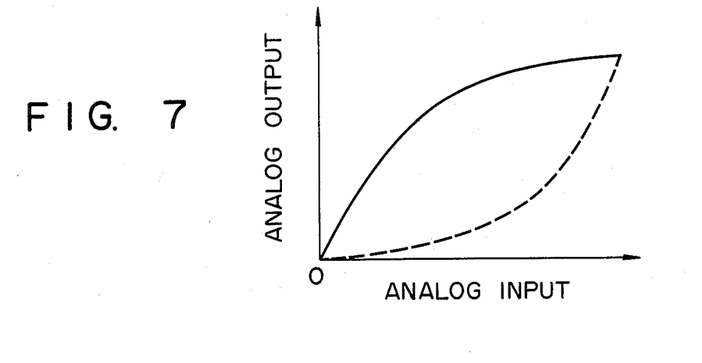
FIG. 7 is a graph showing the input/output characteristics of $\gamma$ and $\gamma^{-1}$ converters of the apparatus shown in FIG. 1.

When optical data is converted to an analog electrical signal and then to a digital electrical signal, the S/N ratio of the signal tends to decrease when the signal represents a low luminance. One of the reasons for this decrease lies in the fact that the solid-state image pickup device has a low S/N ratio for the low luminance. Another reason is that the number of bits assigned to the analog signal which represents the low luminance is small, thereby allowing for the receipt of external noise and quantization noise. To eliminate this problem, according to the first embodiment, the $\gamma$ characteristic of the image signal is converted by the $\gamma$ converter 14 before the image signal is A/D-converted. The input/output characteristics of the $\gamma$ converter 14 are indicated by the solid curve in FIG. 7. In this manner, the analog value at the low luminance side is increased by the $\gamma$ converter 14, so that the S/N ratio of the image signal can be improved. Therefore, the image signal becomes nonlinear as a function of luminance. This $\gamma$ conversion is not essential to the scope of the present invention and can be omitted.

Figure 8:
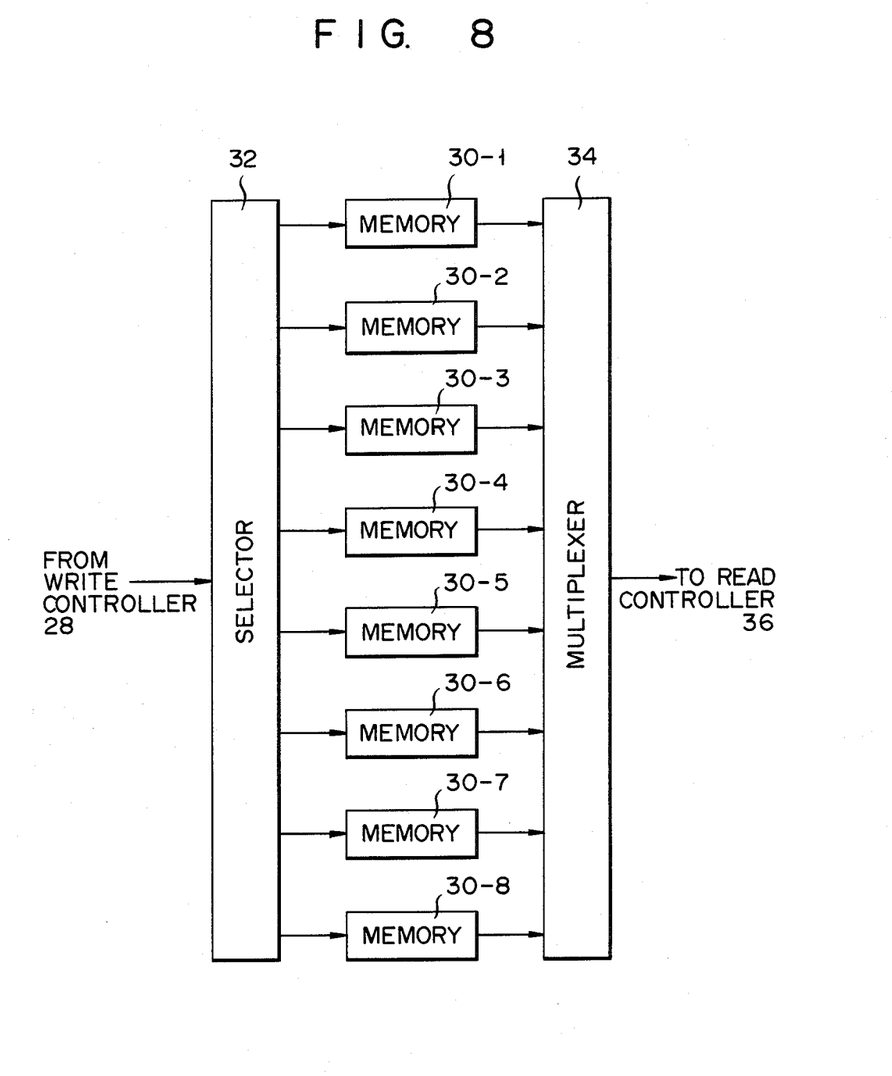
FIG. 8 is a block diagram showing the detailed configuration of a pixel memory of the apparatus shown in FIG. 1.

The output image signal from the $\gamma$ converter 14 is converted by the A/D converter 16 to an 8-bit digital signal for each pixel. The output terminal of the A/D converter 16 is connected to the first input terminal of an adder 26. An output from the adder 26 is supplied to a pixel memory 30 through a write controller 28. Since the digital image signal for each pixel comprises 8 bits, the pixel memory 30 has a byte capacity corresponding to the total number of pixels of the solid-state image pickup device 10. The pixel memory 30 comprises eight memories 30-1, 30-2, . . . , and 30-8 which respectively store individual bit data of the 8-bit signal, as shown in FIG. 8. The bit-serial signal from the write controller 28 is divided by a selector 32 into 8 bit-signals which are respectively stored in the memories 30-1 to 30-8. The readout signals from the memories 30-1 to 30-8 are multiplexed by a multiplexer 34. A single signal from the multiplexer 34 is supplied to a read controller 36. The output terminal of the read controller 36 is connected to the (+) input terminal of a subtracter 38.

The output terminal of the subtracter 38 is connected to the input terminals of a delay circuit 40 and a D/A converter 42. An output signal from the delay circuit 40 is supplied to the second input terminal of the adder 26. An output signal from the adder 26 is also supplied to a max/min detector 44. The detector 44 serves to detect the maximum and minimum values of the one-frame image signal. The maximum and minimum signals from the detector 44 are supplied to an image controller 46. The image controller 46 controls the adder 26, the write controller 28 and the read controller 36 and supplies the minimum signal to the (-) input terminal of the subtracter 38.

The output from the D/A converter 42 is supplied, through a $\gamma^{-1}$ converter 48, to a display device 50 and a recording system 52. The $\gamma^{-1}$ converter 48 performs reverse conversion with reference to that of the $\gamma$ converter 14. The input/output characteristics of the $\gamma^{-1}$ converter 48 are indicated by the broken curve in FIG. 7. An output signal from the preamplifier 12 is also supplied to the display device 50. In the first embodiment, the one-frame image signal is stored in the pixel memory 30, so the recording system 52 can be omitted. However, in order to record image signals corresponding to a plurality of frames, the recording system 52 serves to record analog-converted image signals in a large-capacity recording medium. A medium such as a magnetic tape, a magnetic disc, an optomagnetic disc, etc., which accompanies movement relative to the recording head, is preferred as the large-capacity recording medium. The output from the $\gamma^{-1}$ converter 48 comprises a simple image signal, so that this signal is properly video-processed in the display device 50 and the recording system 52, thereby obtaining a video signal.

Figure 9:
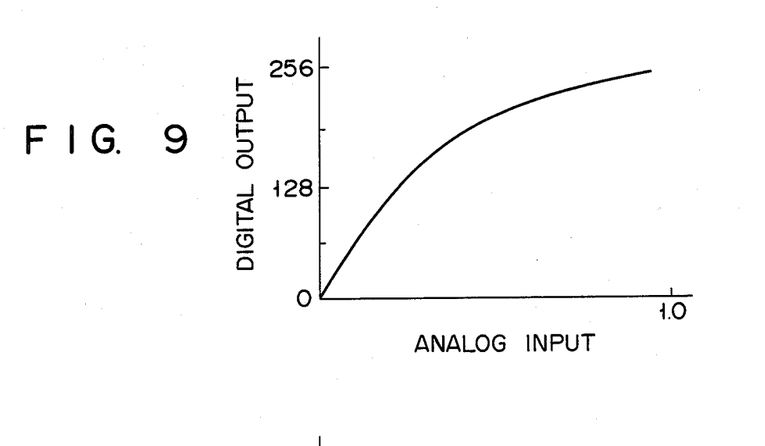
FIGS. 9 and 10 are graphs showing the input/output characteristics of an A/D converter having a $\gamma$ conversion function, and a D/A converter having a $\gamma^{-1}$ conversion function in a modification of the apparatus shown in FIG. 1, respectively.
Figure 10:
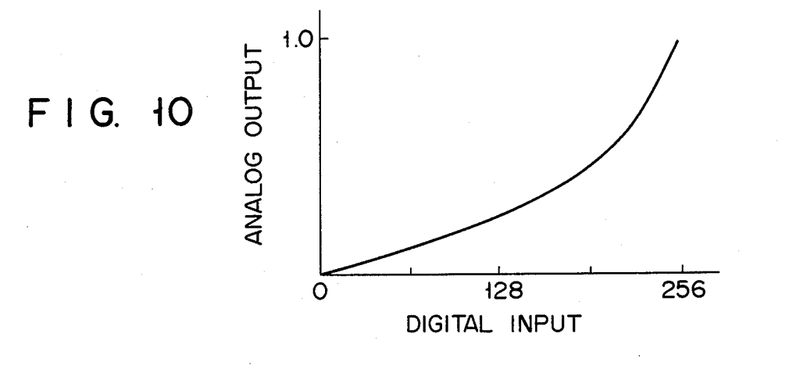

In the above embodiment, the $\gamma$ and $\gamma^{-1}$ conversions are respectively performed by exclusive converters. However; if, in the A/D converter 16 and the D/A converter 42, the signals are nonlinearly converted, the $\gamma$ and $\gamma^{-1}$ converters 14, 42 need not be used. In this case, the input/output characteristics of the A/D and D/A converters 16, 42 are those which are shown in FIGS. 9 and 10, respectively.

The principle of the first embodiment will be described before the operation thereof is discussed. According to the first embodiment, to write a one-frame still image signal into the pixel memory, exposure time (i.e., the light-receiving time interval of the solid-state image pickup device) is divided into a plurality of small intervals, and image signals received during those small intervals are accumulated, thereby obtaining a one-frame still image signal. In general, unstable components are increased as a function of time in the case of signal processing in the analog region. For this reason, it is preferable in signal processing that the period during which the signal has an analog value be shortened, and that the analog signal be immediately converted to a digital signal, thereby processing the signal in the digital region. In the first embodiment, the analog image signal generated by the solid-state image pickup device is extracted in units of predetermined time intervals $\tau$, and is converted to a digital signal. This digital signal is added to the readout signal from the pixel memory. The resultant sum is written into the pixel memory. The above operation is then repeated a number of times (i.e., N times). As a result, the analog signals during time interval $N \times \tau$ are accumulated. When N such additions are performed, noise components such as a change in the dark current component, preamplifier noise and quantization noise, which are included in the signal (image signal), are reduced according to the inverse of $\sqrt{N}$, thereby improving the S/N ratio.

The operation of the image recording apparatus according to the first embodiment may now be described with reference to the time charts shown in FIGS. 11A to 11H. The solid-state image pickup device 10 always operates in such a way as to produce an image signal for each field (frame), as shown in FIG. 11C. Symbols "F0", "F1", "F2", "F3" and "F4" denote the image signals of each field produced from the pickup device 10. The pixel memory 30 always functions to output the stored image signal, as shown in FIG. 11D. The symbol "0" denotes no image signal.

Figure 11A:
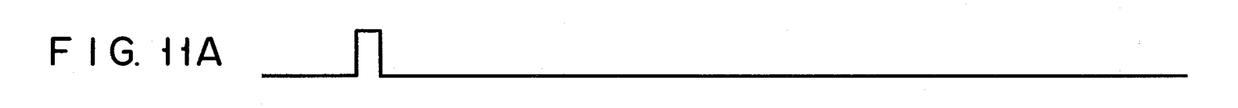
FIGS. 11A to 11H are time charts illustrating the operation of the apparatus shown in FIG. 1.
Figures 11B, 11C:
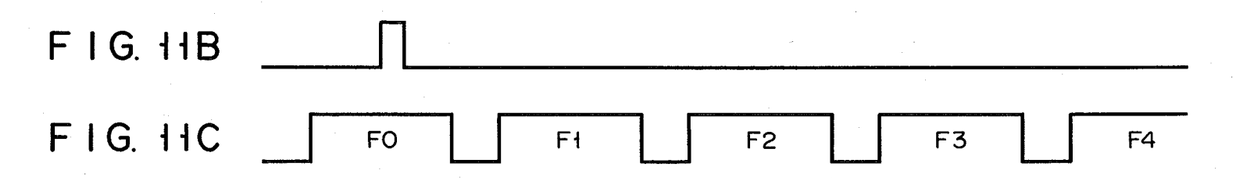
Figure 11D:
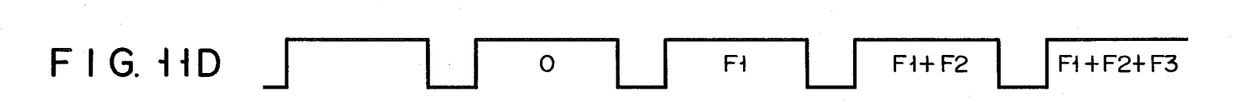
Figure 11E:
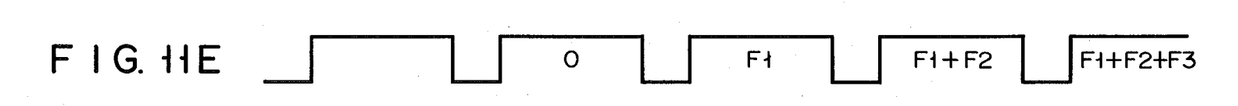

When the pickup device 10 produces the "F0" field image signal, a shutter trigger signal is produced, as shown in FIG. 11A. In response to the shutter trigger signal, a reset signal is generated, as shown in FIG. 11B, to reset the pixel memory 30 and the max/min detector 44.

During a vertical blanking period, after the "F0" image signal is read out from the pickup device 10, the data "0" in the pixel memory 30, which has been reset, is read out, as shown in FIG. 11D. The readout operation of the pixel memory 30 is controlled by a clock signal from a clock generator (not shown), which has the same frequency as that of the clock signal of the pickup device 10.

The readout signal from the pixel memory 30 (FIG. 11D) is delayed for a period of time (FIG. 11E) which is determined by multiplying the clock period of the pickup device 10 an integral number of times. Each pixel signal in the readout signal from the pickup device 10 corresponds to each pixel in the pixel memory 30. Therefore, the delayed signal is supplied to the adder 26 when the next-field image signal is supplied to the adder 26 from the pickup device 10.

Figures 11F, 11G:
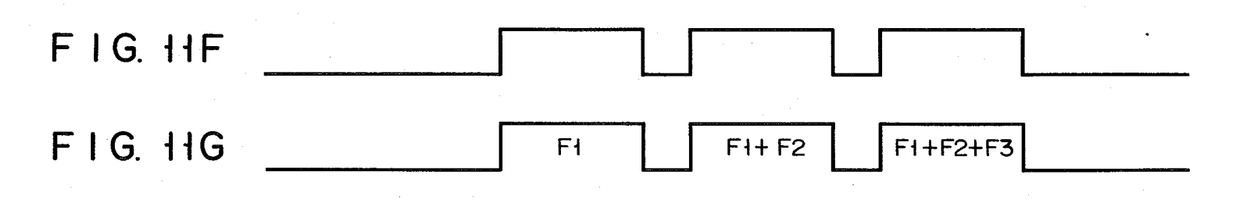

The adder 26 is active when the "F1" image signal is generated from the pickup device 10, as shown in FIG. 11F. In this way, the added signal is written into the pixel memory 30, as shown in FIG. 11G. Since the delayed signal is "0", only the "F1" signal is written in.

When the output of the "F1" signal from the pickup device 10 is terminated, the writing of the "F1" signal into the pixel memory 30 is also terminated, as shown in FIG. 11G.

The maximum and minimum levels of the one-field image signal written into the pixel memory 30 are detected by the detector 44. The minimum signal is supplied to the subtracter 38. It is subtracted from the image signal read out from the pixel memory 30, thereby eliminating the dark current component from the image signal. As a result, the dynamic ranges of the image pickup device 10 and the pixel memory 30 are widened.

During the vertical blanking period, after the "F1" signal is read out from the pickup device 10, the "F1" image signal is read out from the pixel memory 30 prior to the readout of "F2" signal from the pickup device 10. The readout "F1" signal is also delayed by the delay circuit 40.

When the pickup device 10 produces the "F2" image signal, the adder 26 is active, as shown in FIG. 11F and the delayed "F1" signal is added to the "F2" signal from the pickup device 10. The "F1+F2" signal is written into the pixel memory 30, as shown in FIG. 11G.

Subsequently, the "F1+F2+F3" image signal is written into the pixel memory 30, as described above.

Figure 11H:
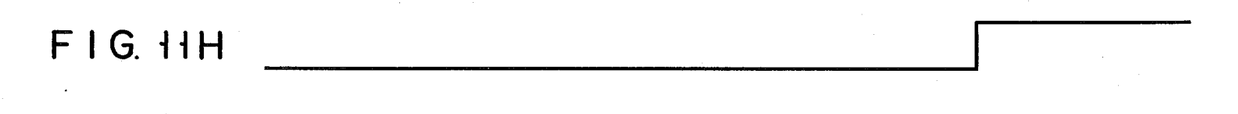

The halting of the writing of the image signal into the pixel memory 30 may be described as follows. It is assumed that the written image signal at one or more pixels is over a given level, during the time the "F3" signal is being produced by the pickup device 10. The max/min detector 44 produces the max signal, as shown in FIG. 11H, denoting that the maximum level of the image signal is over the given level. In response to the max signal, the image signals following the "F3" signal are not written into the pixel memory 30. Therefore, the accumulating process is performed up to only the "F3" field. After that, the accumulated "F1+F2+F3" image signal is cyclically read out from the pixel memory 30 and displayed by the display device 50.

Figure 12A:
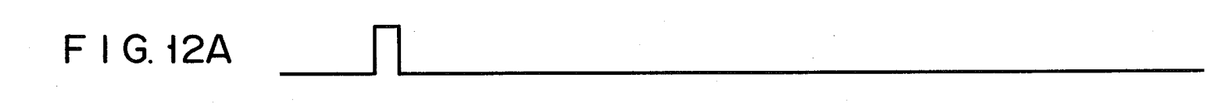
FIGS. 12A to 12F show time charts illustrating another operation of the apparatus shown in FIG. 1.
Figure 12B:
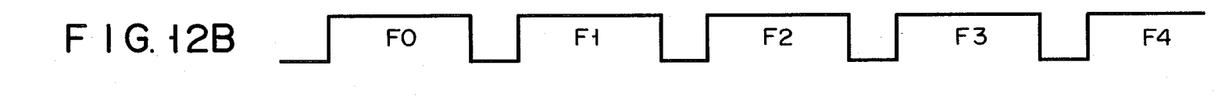
Figure 12C:
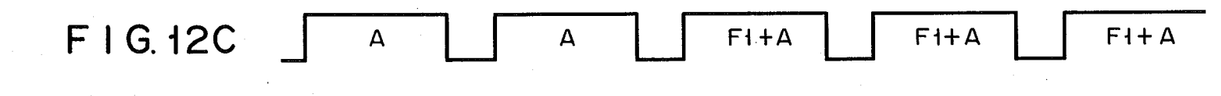
Figure 12D:
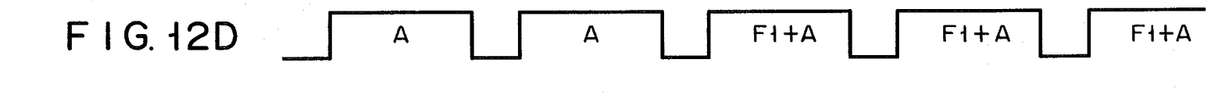
Figure 12E:
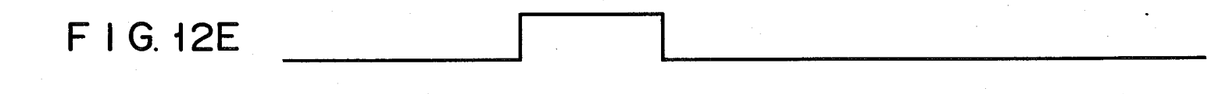
Figure 12F:
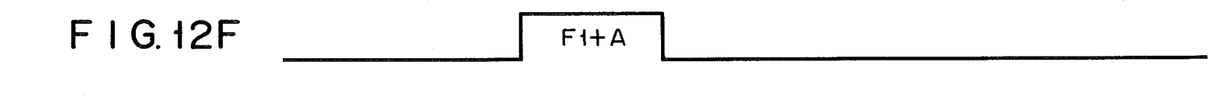

This embodiment can combine two images into one image signal. When the pixel memory 30 is not saturated and the shutter trigger signal is produced without memory reset, the "A" image signal of the preceeding image stored in the pixel memory 30 and the "F1" image signal produced from the pickup device 10 are combined. FIG. 12A shows the shutter trigger signal. FIGS. 12B, 12C and 12D show outputs from the pickup device 10, the pixel memory 30 and the delay circuit 40, respectively. The signal shown in FIG. 12E indicates that the adder 26 is active. FIG. 12F shows the signal input to the pixel memory 30.

According to the first embodiment described above, one still image is obtained by accumulating N photographic results, thereby performing long exposure. Therefore, the various types of noise components can be compressed to $1/\sqrt{N}$, so that a high S/N ratio can be obtained. Furthermore, the dark current component can be removed at the time of accumulation, so that the dynamic range of the recorded image can be widened. Since each of the divided light-receiving time intervals is very short, e.g. 30 ms, the exposure time can be precisely controlled. The elimination of the dark current component allows for effective utilization of the dynamic range of the pixel memory, so that the pixel memory need only have a small capacity. Furthermore, the outputs from the solid-state image pickup device are written into the pixel memory without performing any video processing, so that the pixel memory can have a capacity smaller than that of the conventional frame memory. When the updated accumulation images are continuously monitored, the gradually-improving image quality can be visually checked. The image recording apparatus of the first embodiment can be used in a bright location, as well as in a dark location, by reducing the aperture to obtain an image having a deep depth of field. Furthermore, when a stroboscopic lamp is lit in synchronism with the read rate of the signals from the solid-state image pickup device, the image recording apparatus can be used to photograph a remote object in a completely dark location. It is to be noted here that the changes in the sensitivity of the solid-state image pickup device, and dark current with respect to the temperature, can be automatically compensated.

In the above description, the dark current is always removed. However, if the exposure time is very short, the dark current need not be removed. In the above embodiment, the exposure time is determined by the maximum value of the accumulated signal. However, any other available technique might also be used. For example, the exposure time might be determined by calculating the difference between the maximum and minimum values of the first field image signal. The exposure time might also be manually determined, by using an external exposure meter. Furthermore, when the configuration and read timing of the pixel memory are changed, the delay circuit 40 can be omitted. The read rate of the solid-state image pickup device 10 has been described as complying with that used in motion pictures, i.e. 30 ms. However, any read rate may be used as needed. If the read frequency is increased as accumulation advances, a more precise exposure control can be effected. The capacity of the pixel memory 30 is preset to be 8 bits/pixel in the above embodiment. However, this capacity can be arbitrarily changed. A frame memory for recording video-processed image signals may be used in place of the pixel memory 30. The pixel memory 30 preferably comprises a memory with which read and write operations can be simultaneously performed. Furthermore, when dark shadings differ in different pixels in the image pickup device, each pixel image can be weighted by the subtracter 38.

Figure 13:
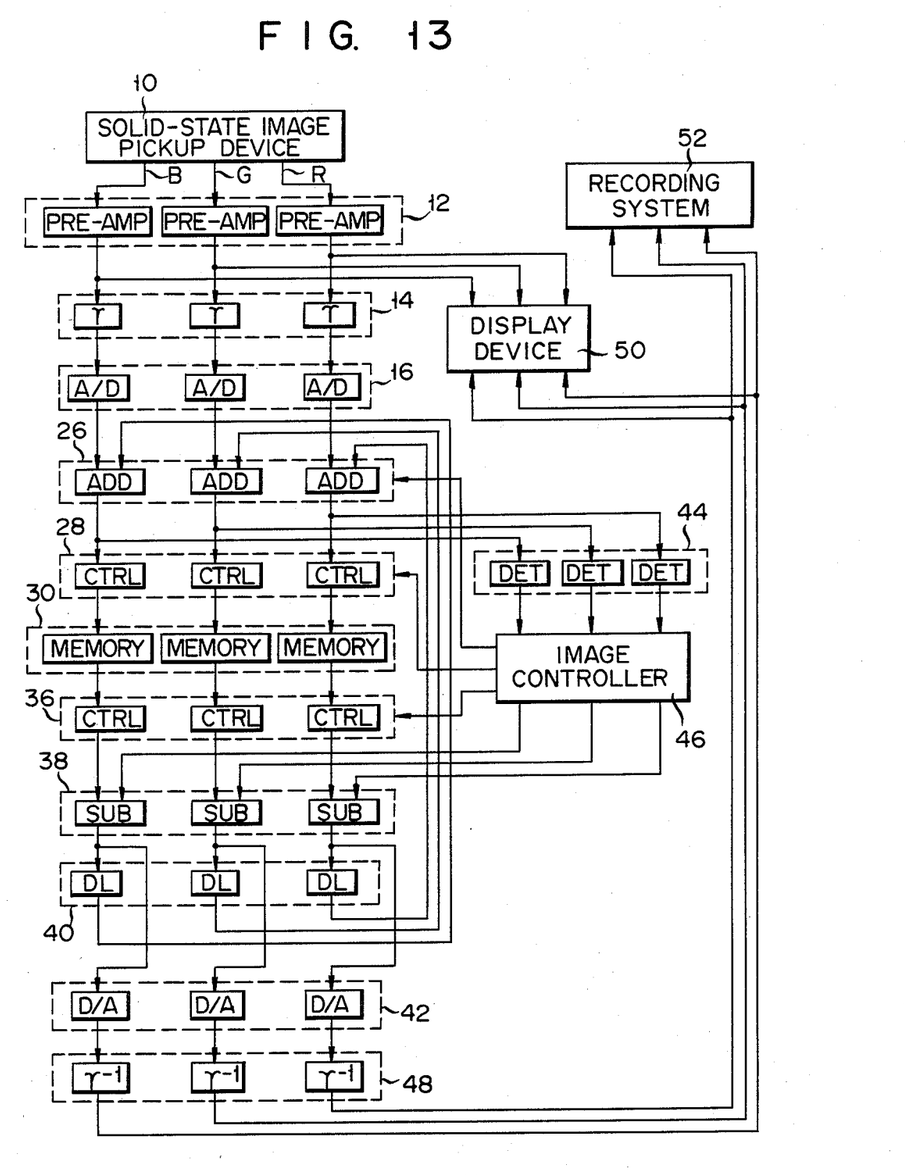
FIG. 13 is a block diagram of an image recording apparatus according to a second embodiment of the present invention.
Figure 14:
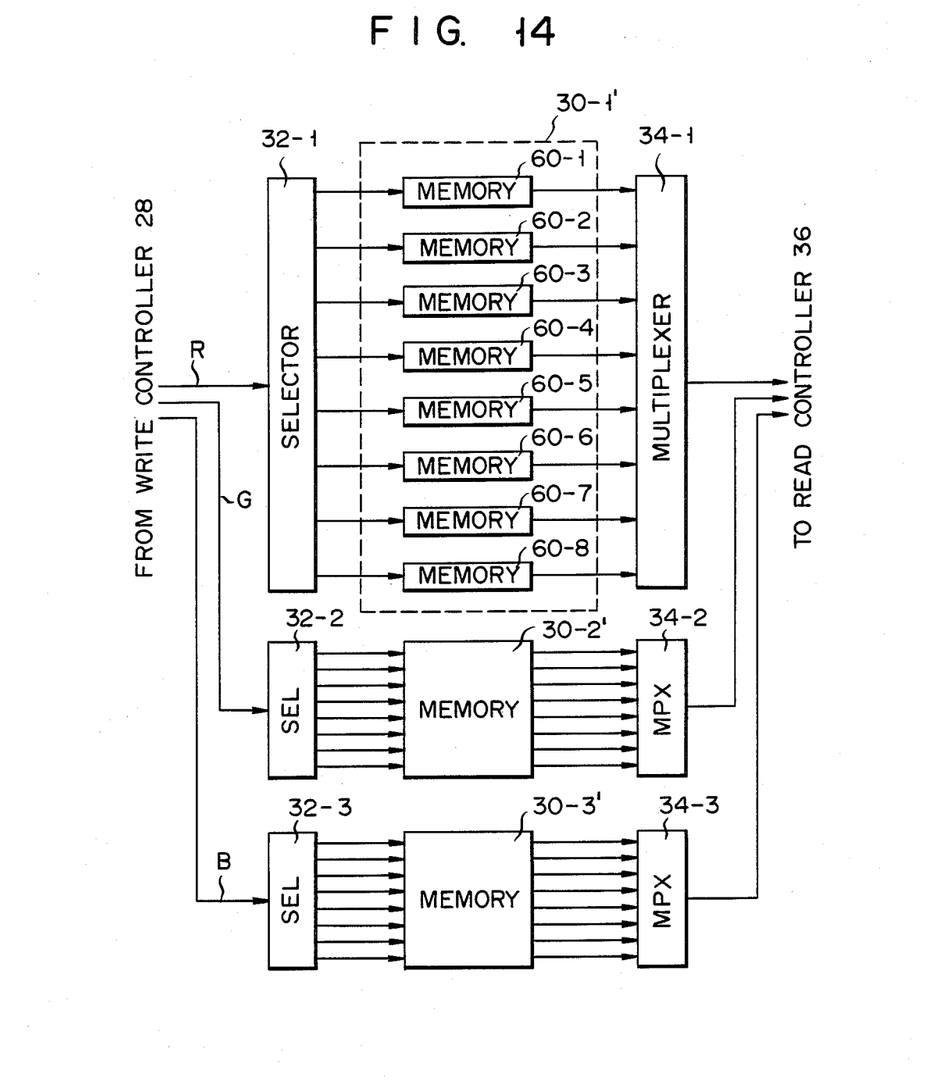
FIG. 14 is a block diagram of a pixel memory of the apparatus shown in FIG. 13.

An image recording apparatus according to a second embodiment of the present invention may now be described with reference to FIG. 13. In the first embodiment, the R, G and B color component signals are combined to form a composite serial signal. However, in the second embodiment, the R, G and B color component signals are parallel-processed. The overall signal processing in the second embodiment is substantially the same as that of the first embodiment. According to the second embodiment, the overall drive frequency can be decreased. In general, the characteristics of the respective color components differ from one another. When signal processing is performed for each color component, a higher quality image can be obtained. The solid-state image pickup device 10 of the second embodiment can be obtained by adding a selector for dividing the serial output into the R, G and B component signals to the solid-state image pickup device 10 (FIGS. 2, 3 and 4) of the first embodiment. The two-chip or three-chip type device obtained by eliminating multiplexer 24 from the device of FIG. 5 or 6 might be used in the second embodiment. The detailed configuration of a pixel memory 30 of the apparatus of the second embodiment is illustrated in FIG. 14. Each pixel memory 30-1', 30-2' or 30-3' has eight memories 60-1, 60-2, ..., and 60-8 for respectively storing bit signals of 8-bit image data. The R, G and B component signals from a write controller 28 are divided into the corresponding bit memories through selectors 32-1, 32-2 and 32-3. The R, G and B bit signals from the memories 30-1', 30-2' and 30-3' are multiplexed by multiplexers 34-1, 34-2 and 34-3, respectively, thereby obtaining the R, G and B component signals. These component signals are supplied to a read controller 36.

As may be seen from the above description, the present invention provides an image recording apparatus using a solid-state image pickup device which allows for a long exposure time. When the solid-state image pickup device of the present invention is replaced with a still-image-signal generator using a disc or tape, an image processing system is provided which serves to eliminate random noise of the still image signal and improve the S/N ratio. Furthermore, the addition process employed in the present invention is effective when an accumulation is not performed. In such a case, the output from the solid-state image pickup device is written into the pixel memory as the dark current component, while the solid-state image pickup device is shielded from the light. The readout signal from the pixel memory is inverted and an inverted readout signal is added to the output from the image pickup device after exposure, thereby eliminating the dark current. In this case, a two-dimensionally distributed dark shading can be completely corrected.

What is claimed is:
1. An image recording apparatus, comprising:
solid-state image pickup means;
A/D converting means for converting a one-frame analog image signal from said solid-state image pickup means to a one-frame digital image signal; and
recording means coupled to said A/D converting means for accumulating a plurality of one-frame digital image signals from said A/D converting means to form a single one-frame digital image signal, and for recording the single one-frame digital image signal;
said recording means comprising:
a memory for storing the single one-frame digital image signal;
an adder having two input terminals, one of which is coupled to an output of said A/D converting means and the other of which is indirectly coupled to an output of said memory, and an output terminal coupled to an input of said memory, said adder adding the one-frame digital image signal produced from said A/D converting means and a processed single one-frame digital image signal produced from the memory and writing the addition results into said memory;
detecting means coupled to said output terminal of said adder for detecting a minimum value of the single one-frame digital image signal; and
a subtractor having two input terminals respectively coupled to said output of said memory and an output of said detecting means, and an output terminal coupled to one of said input terminals of said adder to provide said indirect coupling of said adder to said output of said memory, said subtracter subtracting the minimum value from the single-one frame digital image signal read out from said memory to provide said processed single one-frame digital signal.

2. An apparatus according to claim 1, wherein said solid-state image pickup means generates the one-frame analog image signal at N predetermined time intervals (where N is any natural number), and said adder performs (N - 1) additions.

3. An apparatus according to claim 1, wherein the single one-frame digital image signal stored in said memory is read out and supplied to said adder through a dealy circuit in synchronism with the one-frame digital image signal from said A/D converting means.

4. An apparatus according to claim 1, wherein said solid-state image pickup means generates parallel-output image signals of color components, said A/D converting means, said adder, said memory, said detecting means and said subtracter being provided for each of the image signals of the color components.

5. An image recording apparatus, comprising:
solid-state image pickup means;
A/D converting means for converting a one-frame analog image signal from said solid-state image pickup means to a one-frame digital image signal; and
recording means coupled to said A/D converting means for accumulating a plurality of one-frame digital image signals from said A/D converting means to form a single one-frame digital image signal, and for recording the single one-frame digital image signal;
said recording means comprising:
a memory for storing the single one-frame digital image signal;
an adder having two input terminals respectively coupled to outputs of said A/D converting means and of said memory, and an output terminal coupled to an input of said memory, said adder adding the one-frame digital image signal produced from said A/D converting means and a single one-frame digital image signal produced from the memory and writing the addition results into said memory;
detecting means coupled to said output terminal of said adder for detecting a maximum value of the single one-frame digital image signal; and
means for interrupting the writing of data into said memory when the maximum value detected by said detecting means exceeds a given value.

6. An apparatus according to claim 5, wherein said solid-state image pickup means generates the one-frame analog image signal at N predetermined time intervals (where N is any natural number), and said adder performs (N - 1) additions.

7. An apparatus according to claim 5, wherein the single one-frame digital image signal stored in said memory is read out and supplied to said adder through a delay circuit in synchronism with the one-frame digital image signal from said A/D converting means.

8. An apparatus according to claim 5, wherein said solid-state image pickup means generates parallel-output image signals of color components, said A/D converting means, said adder, said recording means, said detecting means and said interrupting means being provided for each of the image signals of the color components.

9. An image recording apparatus, comprising:
solid-state image pickup means;
A/D converting means for converting a one-frame analog image signal from said solid-state image pickup means to a one-frame digital image signal; and
recording means coupled to said A/D converting means for accumulating a plurality of one-frame digital image signals which are intermittently and successively picked up by said pickup means and output from said A/D converting means to form a single one-frame digital image signal, and for recording the single one-frame digital image signal;
said recording means comprising:
a memory for storing the single one-frame digital image signal;
an adder having two input terminals, one of which is coupled to an output of said A/D converting means and the other of which is indirectly coupled to an output of said memory, and an output terminal coupled to an input of said memory, said adder adding the one-frame digital image signal produced from said A/D converting means and a processed single one-frame digital signal produced from the memory and writing the addition results into said memory;
detecting means coupled to said output terminal of said adder for detecting a minimum value of the single one-frame digital image signal; and
a subtracter having two input terminals respectively coupled to said output of said memory and an output of said detecting means, and an output terminal coupled to one of said input terminals of said adder to provide said indirect coupling of said adder to said output of said memory, said subtracter subtracting the minimum value from the single one-frame digital image signal read out from said memory to provide said processed single one-frame digital signal.

10. An apparatus according to claim 9, wherein said solid-state image pickup means generates the one-frame analog image signal at N predetermined time intervals (where N is any natural number), and said adder performs (N - 1) additions.

11. An apparatus according to claim 9, wherein the single one-frame digital image signal stored in said memory is read out and supplied to said adder through a delay circuit in synchronism with the one-frame digital image signal from said A/D converting means.

12. An apparatus according to claim 9, wherein said solid-state image pickup means generates parallel-output image signals of color components, said A/D converting means and said recording means being provided for each of the image signals of the color components.

13. An apparatus according to claim 9, wherein said solid-state image pickup means generates parallel-output image signals of color components, said A/D connecting means, said adder, said memory, said detecting means and said subtracter being provided for each of the image signals of the color components.

14. An image recording apparatus, comprising:
solid-state image pickup means;
A/D converting means for converting a one-frame analog image signal from said solid-state image pickup means to a one-frame digital image signal; and
recording means coupled to said A/D converting means for accumulating a plurality of one-frame digital image signals which are intermittently and successively picked up by said pickup means and output from said A/D converting means to form a single one-frame digital image signal, and for recording the single one-frame digital image signal;
said recording means comprising:
a memory for storing the single one-frame digital image signal;
an adder having two input terminals respectively coupled to outputs of said A/D converting means and of said memory, and an output terminal coupled to an input of said memory, said adder adding the one-frame digital image signal produced from said A/D converting means and a single one-frame digital signal produced from the memory and writing the addition results into said memory;
detecting means coupled to said output terminal of said adder for detecting a maximum value of the single one-frame digital image signal; and
means for interrupting the writing of data into said memory when the maximum value detected by said detecting means exceeds a given value.

15. An apparatus according to claim 14, wherein said solid-state image pickup means generates the one-frame analog image signal at N predetermined time intervals (where N is any natural number), and said adder performs (N - 1) additions.

16. An apparatus according to claim 14, wherein the single one-frame digital image signal stored in said memory is read out and supplied to said adder through a delay circuit in synchronism with the one-frame digital image signal from said A/D converting means.

17. An apparatus according to claim 14, wherein said solid-state image pickup means generates parallel-output image signals of color components, said A/D converting means and said recording means being provided for each of the image signals of the color components.

18. An apparatus according to claim 14, wherein said solid-state image pickup means generates parallel-output image signals of color components, said A/D converting means, said adder, said memory, said detecting means and said interrupting means being provided for each of the image signals of the color components.

* * * * *